(12) United States Patent
Murata et al.

(10) Patent No.: US 6,213,245 B1
(45) Date of Patent: Apr. 10, 2001

(54) CROSS MEMBER STRUCTURE FOR TRANSMISSION

(75) Inventors: Makoto Murata; Kazuhiro Maeno; Tatsuya Okuno, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,704

(22) Filed: Jun. 16, 1999

(30) Foreign Application Priority Data

Jun. 16, 1998 (JP) .................................................. 10-168207

(51) Int. Cl.$^7$ ..................................................... B60K 17/00
(52) U.S. Cl. ........................... 180/377; 180/312; 280/784
(58) Field of Search ..................................... 180/344, 377, 180/378, 379, 380, 381, 337, 311, 312; 280/781, 784

(56) References Cited

FOREIGN PATENT DOCUMENTS

| 245062 | 11/1990 | (JP) . |
| 6166379 | 6/1994 | (JP) . |

*Primary Examiner*—Eric Culbreth
(74) *Attorney, Agent, or Firm*—Martin A. Farber

(57) ABSTRACT

A transmission having a propeller shaft in the rear is mounted on a cross member which is connected with left and right side frames of a vehicle. The cross member has a closed cross section extending in a transverse direction of the vehicle and is connected at a central portion thereof with the transmission. Two sets of three mounting bolts disposed in a triangular relationship connect the cross member with the left and right side frames through bolt holes slotted in an outward direction of the vehicle on the cross member. When the vehicle has a collision, the transmission is displaced rearwardly and the cross member is deformed to absorb an impact load until the propeller shaft is disconnected from the floor panel.

3 Claims, 6 Drawing Sheets

CROSS MEMBER STRUCTURE FOR TRANSMISSION

BACKGROUND OF THE INVENTION

1. Field of the invention

The present invention relates to a vehicle cross member structure for a transmission and more specifically to a vehicle cross member structure capable of preventing a transmission or a propeller shaft from being protruded to a passenger compartment in an event of a collision.

2. Prior art

In a conventional motor vehicle, various cross members are utilized such as a cross member traversing between left and right front suspensions, a cross member traversing between left and right rear suspensions, a cross member traversing a transmission therebeneath and the like and the present invention relates to a cross member traversing a transmission among them. The object of such a cross member traversing a transmission (hereinafter, referred to as just "cross member") is to reinforce left and right side frames and at the same time to hold a power train including a transmission from underneath. Further, another object of the cross member is to protect an occupant from being injured by the transmission protruding into to the passenger compartment when an impact acts on the vehicle from outside. That is, the cross member is constituted such that the transmission including an engine is disconnected from the body so as to fall down in an event of an impact.

FIGS. 4 through 5b show a typical example of a cross member utilized in a power train system of a vehicle, in which a transmission 1 having an engine 3 in front and a propeller shaft in the rear is supported by a cross member 27 traversing between left and right side frames (not shown). The propeller shaft 2 comprises a first joint 1J connected to the output shaft of the transmission 1, a second joint 2J provided between a front shaft 2A and a rear shaft 2B and a third joint 3J connected to a rear differential and is supported by a floor panel therebeneath through a bracket 6 in the vicinity of the second joint 2J.

As shown in FIG. 5a, the cross member 27 has a U-shaped cross section downwardly opening. Further, as shown in FIG. 5c, the intermediate part of the propeller shaft 2A is supported by the bracket 6 which is mounted on the floor panel by mounting bolts through volt holes 6A, 6B opening in the front direction of the vehicle, so that the bracket 6 is detached from the mounting bolts when an impact is applied to the propeller shaft 2.

As shown in FIG. 6, when an impact F1 acts on the transmission 1, a moment M1 is caused, so as rotating the upper surface of the cross member 27 rear-downwardly, and a rear end of the transmission 1 and the first joint 1J move rear-downwardly by this moment, since the cross member 27 having a U-shaped cross section has a small torsional rigidity. As a result, the front shaft 2A of the propeller shaft 2 is inclined rear-upwardly. Thereby an upward force F2 is caused at the intermediate point of the propeller shaft 2 to push the second joint 2J upwardly.

In order to obviate such a defect, Japanese Examined Utility Model Application No. Jitsu-Ko-Hei 2-45062 and Japanese Patent Application Laid-open No. Toku-Kai-Hei 6-166379 were proposed.

As well known, since the closed cross section structure has a large resistance to torsion, downward displacements of the rear end of the transmission 1 and the first joint 1J and the inclination of the front shaft 2A of the propeller shaft 2 are smaller than those of the U-shaped cross section structure. Thereby the front shaft 2A of the propeller shaft 2 is prevented from being projected toward the floor panel.

However, such a cross member structure as relying only upon a resistance to torsion is still insufficient for stably displacing the transmission rearwardly when an impact is applied to the transmission.

SUMMARY OF THE INVENTION

It is an object of the present invention to provide a cross member structure for a transmission capable of absorbing an impact load according to the magnitude of the impact load and finally dropping the transmission to protect occupants.

In order to attain the object, the cross member structure comprises a cross member having a closed cross section structure extending in a transverse direction of the vehicle, connected at left and right ends thereof with left and right frames respectively and connected at a central portion thereof with a transmission, two sets of three mounting bolts disposed in a triangular relationship for mounting the cross member on the left and right side frames respectively, the mounting bolts comprising a mounting bolt disposed on each of the left and right end portions thereof respectively and a pair of mounting bolts aligned in a longitudinal direction of the vehicle and disposed on each of the left and right portion near to the central portion of the cross member respectively, and bolt holes slotted in an outward and transverse direction of the vehicle on the cross member for applying the respective mounting bolts therethrough.

BRIEF DESCRIPTION OF THE DRAWINGS

FIG. 1b is a cross sectional view taken along the line 1b—1b in FIG. 1a;

FIG. 2b is a cross sectional view taken along the line 2b—2b in FIG. 2a;

FIG. 5b is a cross sectional view taken along the Line 5b—5b in FIG. 5a;

FIG. 5c is an enlarged bottom view of a bracket for supporting a propeller shaft illustrated in FIG. 5a.

DETAILED DESCRIPTION OF PREFERRED EMBODIMENTS

Figure 1B:
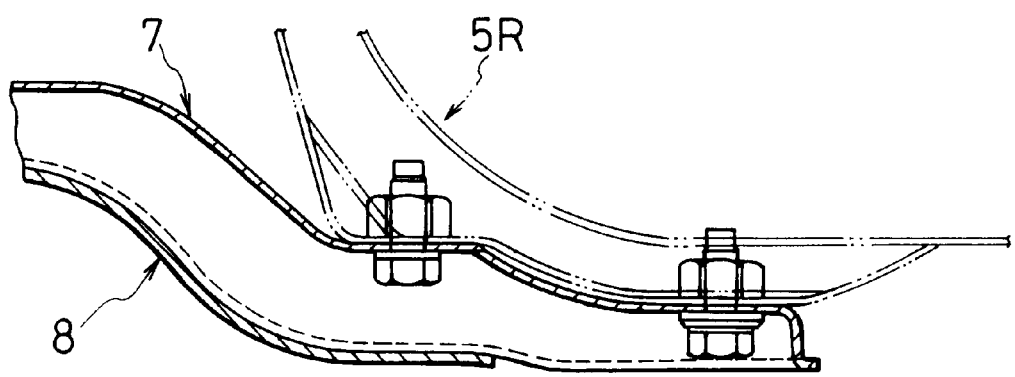
Figure 2A:
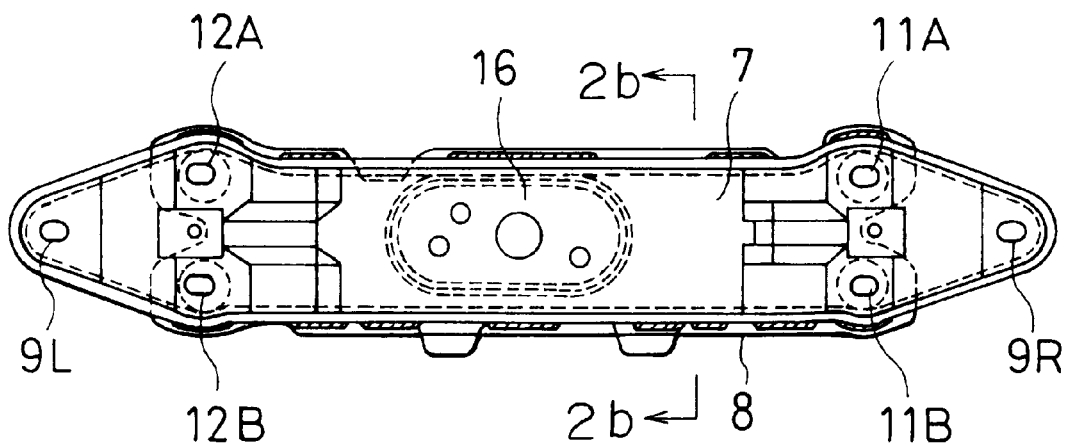
FIG. 2a is an overall top view of a cross member according to an embodiment of the present invention.

Referring now to FIG. 2a, numeral 7 denotes a cross member which is connected at left and right ends thereof with left and right side frames extending in the longitudinal direction of a vehicle, respectively. FIG. 1b indicates a cross member connected at a right end thereof with a right side frame 5R.

A cushion rubber 16 is disposed on the upper surface of the central portion of the cross member 7. On the cushion rubber 16, a transmission 1 having a propeller shaft 2 in the rear is mounted in an orthogonal relationship with the cross member 7.

Figure 2B:
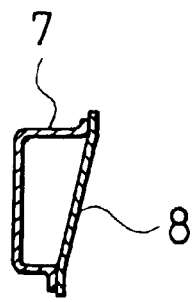

Further, since the cross member 7 is bent upwardly at the connecting portion thereof with the side frame 5R as shown in FIG. 1b, the transmission is supported at a higher position than the connecting portion. Further, the cross member 7 forms a closed cross section structure extending laterally as shown in FIG. 2b by welding a lower plate 8 from underneath to the cross member 7 having a U-shaped cross section downwardly opening.

Figure 1A:
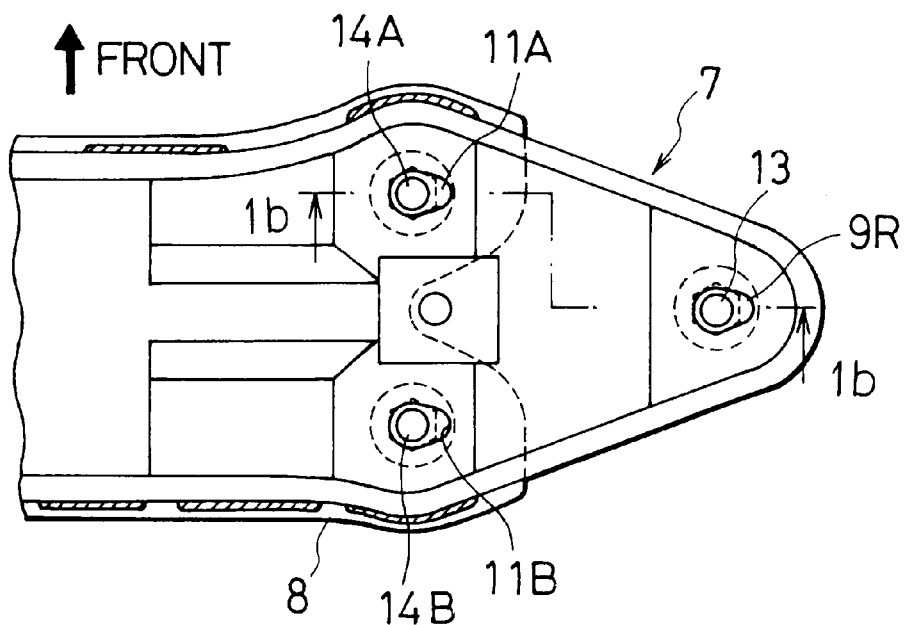
FIG. 1a is a segmentary top view showing a connecting portion of a cross member with a side frame according to an embodiment of the present invention.

As shown in FIG. 1a, the cross member 7 is connected at both ends thereof with the side frame by three mounting bolts 13, 14A, 14B arranged triangularly (similarly arranged on the left side). Preferably, these three mounting bolts 13, 14A, 14B are arranged such that the bolt 13 is located on the tip (end) portion of the cross member 7 and a pair of mounting bolts 14A, 14B aligned in a longitudinal direction of the vehicle are located at the position slightly near to the center thereof.

Further, in this embodiment, bolt holes 9R, 11A, 11B of the cross member 7 which the mounting bolts 13, 14A, 14B go through are shaped into slots extending outwardly in the transverse direction of the vehicle.

Further, the closed cross section structure is formed throughout the cross member 7 extending laterally between the left and right pair of mounting bolts. That is, as illustrated in FIGS. 1a, 1b, the lower plate 8 is disposed underneath of the cross member 7 covering across the right and left slotted bolt holes 11A, 11B, 12A, 12B.

In a normal running of the vehicle, vibrations transmitted from a road to the engine and vibrations and noises transmitted from the engine to the body, are effectively absorbed by engine mounts (not shown) and the cushion rubber 16 of the cross member 7.

Figure 3A:
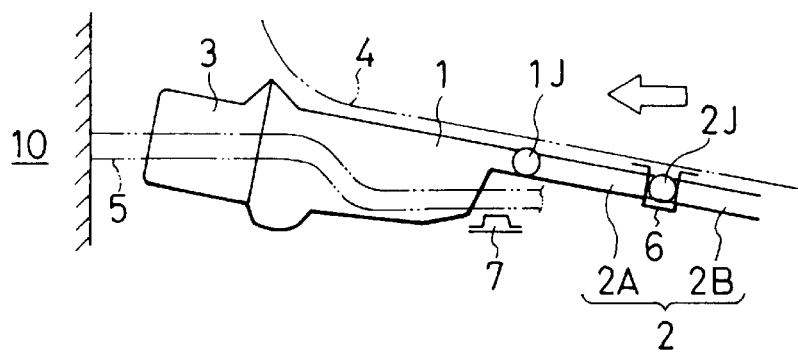
FIGS. 3a through 3d are schematic views showing states of deformation of a power train according to an embodiment of the present invention.

FIGS. 3a through 3d are schematic drawings showing the state of the power train at the event of a collision. First, FIG. 3a shows an instance when the vehicle collides against an obstacle 10, in which the relative positional relationship of the power train such as the engine 3, the transmission 1 and the propeller shaft 2 with respect a floor panel 4 of the vehicle are retained. The side frame 5 is displaced rearwardly while being deformed to some extent until the impact load reaches a first impact load. Then, the engine 3 and the transmission 1 receive such a force as being displaced forwardly.

Figure 3B:
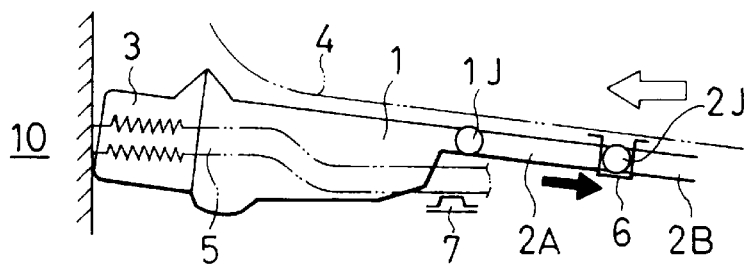
Figure 5A:
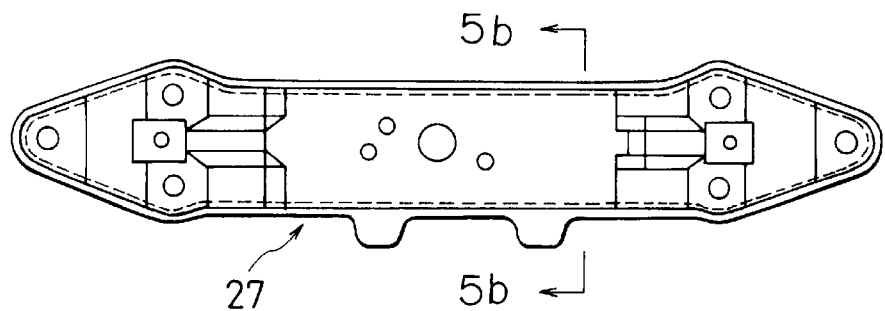
FIG. 5a is a plan view of a conventional cross member.
Figure 5B:
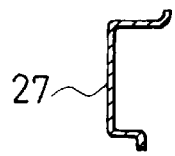
Figure 5C:
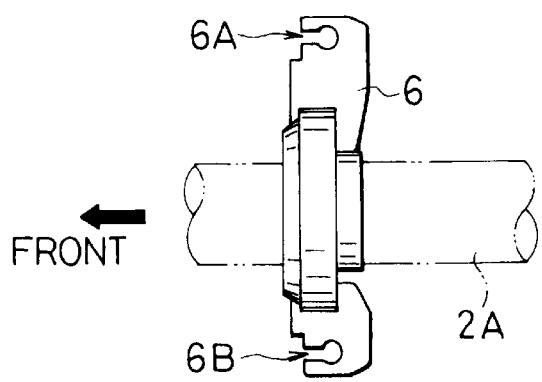
Figure 6:
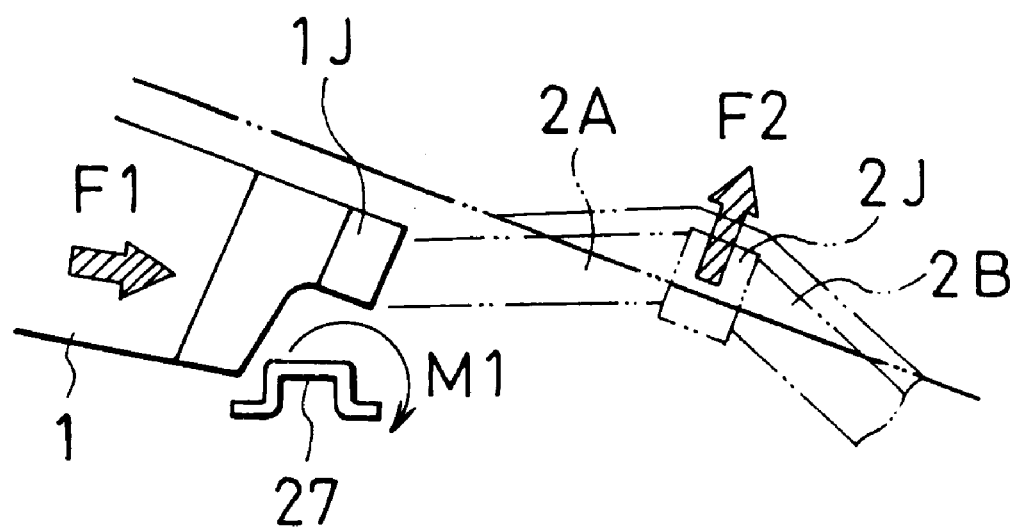
FIG. 6 is a schematic view showing a state of a power train supported by a conventional cross member on an impact.

As shown in FIG. 3b, when the impact load exceeds the first impact load, the engine 3 and the transmission 1 abut against the obstacle 10 to produce an impact load and as a result the impact load is transmitted to the propeller shaft 2 to displace the propeller shaft 2 rearwardly. Then, the bracket 6 for securing the second joint 2J to the body is displaced along the bolt holes 6A, 6B (refer to FIG. 5c).

On the other hand, a force to rotate the cross member 7 rearwardly around an axis connecting the left and right mounting bolts on the top side of the cross member 7 and also a force to bend the cross member 7 rearwardly around the respective left and right mounting bolts on the top side of the cross member 7, are exerted on the cross member. As a result, the mounting bolt 14A receives a force to part the cross member 7 from the side frame 5R and at the same time the cross member 7 is displaced along the slotted bolt holes 13, 14A, 14B.

Figure 3C:
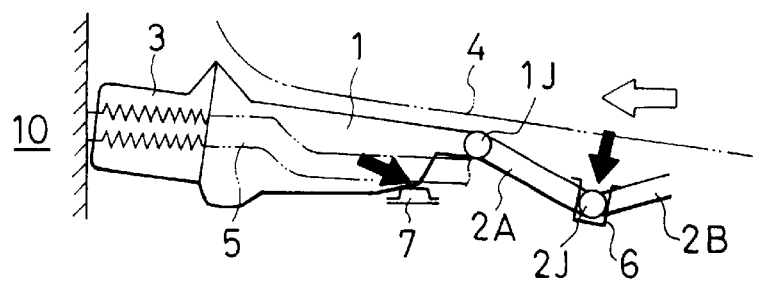

As shown in FIG. 3c, when the impact load exceeds a second impact load, the bracket 6 of the joint 2J is disconnected from the mounting bolts to fall down.

Figure 3D:
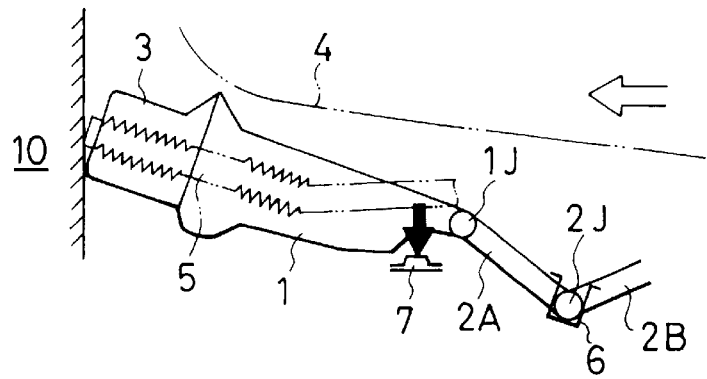
Figure 4:
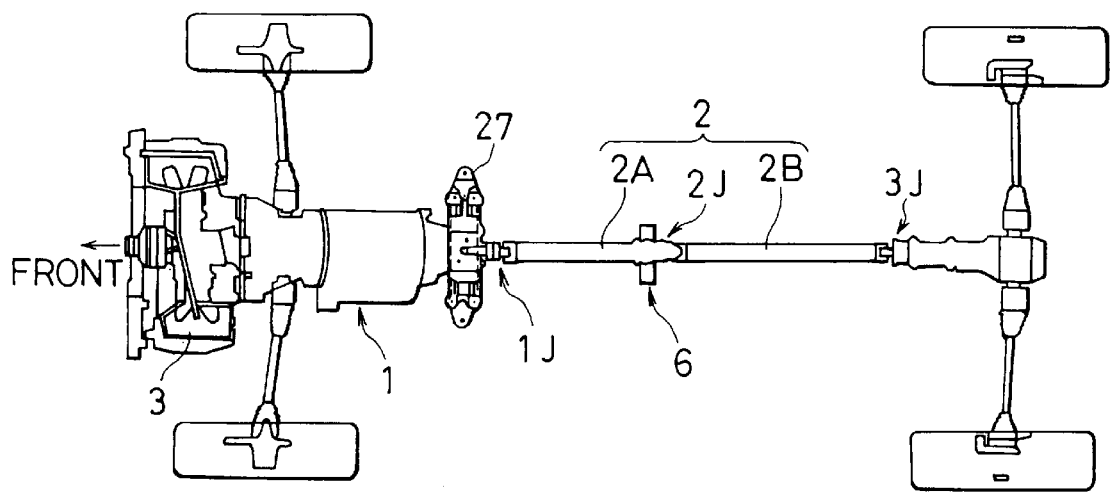
FIG. 4 is a top view of a vehicle mounting a conventional power train system.

Further, as shown in FIG. 3d, when the impact load exceeds a third impact load, the respective mounting bolts 13, 14A, 14B are broken or the slotted bolt holes 9R, 11A, 11B torn off and as a result the power train such as the engine 3, the transmission 1 and the like are broken away from the body.

Further, since the central portion of the cross member 7 is positioned higher than the left and right connecting portions thereof with the left and right side frames, the central portion of the cross member 7 rotates around the left and right connecting portions to promote the dropout of the transmission and the like from the body.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A vehicle cross member structure traversing left and right side frames, said frames extending in a longitudinal direction of a vehicles, for mounting a transmission having a propeller shaft in a rear, the cross member structure comprising:

a cross member having a closed cross section structure extending in a transverse direction of said vehicle, connected at left and right ends of the cross member with said left and right frames respectively and connected at a central portion of said cross member with said transmission;

two sets each of three mounting bolts, each of the three mounting bolts of each respective set being disposed in a triangular relationship for mounting said cross member on said left and right side frames respectively, one of said three mounting bolts being disposed at left and right end portions of said cross member respectively and a remaining pair of said three mounting bolts being aligned in a longitudinal direction of said vehicle and disposed on said left and right end portions of said cross member near said central portion of said cross member respectively; and bolt holes slotted in an outward and transverse direction of said vehicle on said cross member for applying said respective mounting bolts therethrough.

2. The vehicle cross member structure according to claim 1, wherein said closed cross section structure is formed in a transverse direction of said vehicle within a range that at least includes a portion wherein said pair of mounting bolts are disposed.

3. The vehicle cross member structure according to claim 1, wherein said cross member is upwardly bent at connecting portions of said cross member with said left and right side frames so that said central portion is located higher than said connecting portions.

* * * * *